(12) United States Patent
Kikkawa

(10) Patent No.: US 6,833,893 B2
(45) Date of Patent: Dec. 21, 2004

(54) OPTICALLY COMPENSATED BEND TYPE LIQUID CRYSTAL DISPLAY DEVICE

(75) Inventor: Hironori Kikkawa, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 69 days.

(21) Appl. No.: 09/735,907

(22) Filed: Dec. 14, 2000

(65) Prior Publication Data

US 2001/0005247 A1 Jun. 28, 2001

(30) Foreign Application Priority Data

Dec. 24, 1999 (JP) .......................................... 11-368428

(51) Int. Cl.<sup>7</sup> ............................................ G02F 1/1335
(52) U.S. Cl. ...................... 349/117; 349/121; 349/128
(58) Field of Search ................................ 349/117, 121, 349/128, 141, 191

(56) References Cited

U.S. PATENT DOCUMENTS

| | | | | |
|---|---|---|---|---|
| 5,600,461 A | * | 2/1997 | Ueda et al. ..................... | 349/38 |
| 5,825,445 A | * | 10/1998 | Okamoto et al. ........... | 349/118 |
| 5,995,178 A | * | 11/1999 | Fujikawa et al. ............. | 349/55 |
| 6,011,604 A | * | 1/2000 | Miyazawa ................... | 349/110 |
| 6,515,720 B1 | * | 2/2003 | Iizuka et al. .................. | 349/39 |

FOREIGN PATENT DOCUMENTS

| | | |
|---|---|---|
| JP | 63-104026 A | 5/1988 |
| JP | 4-120935 A | 10/1992 |
| JP | 4-349430 | 12/1992 |
| JP | 5-66420 | 3/1993 |
| JP | 8-32845 A | 2/1996 |
| JP | 9-179123 A | 7/1997 |
| JP | H09-230349 | 9/1997 |
| JP | 10-20284 | 1/1998 |
| JP | 10-142638 | 5/1998 |
| KR | 1999-83238 | 11/1999 |

* cited by examiner

Primary Examiner—Robert H. Kim
Assistant Examiner—P. R. Akkapeddi
(74) Attorney, Agent, or Firm—Sughrue Mion, PLLC

(57) ABSTRACT

An OCB (optically compensated bend)-type liquid crystal display device is provided, which possesses high serviceability by suppressing disturbances of the liquid crystal molecules due to nearby electric fields or irregularities of the orientation surface. The OCB-type liquid crystal display device, formed by assembling an active matrix substrate, which comprises a plurality of rectangular pixel regions, each of which is surrounded by one of a plurality of a scanning lines arranged in parallel and one of a plurality of signal lines crossing said plurality of scanning lines through an insulating layer and each of which comprises a pixel electrode and a thin film transistor, and a transparent substrate provided with a common electrode, inserting a liquid crystal therebetween, and the opposing surface of the active matrix substrate and the opposing surface of the transparent substrate are treated so as to have the same orientation directions, wherein said pixel electrode is formed in a closer layer than that of the signal lines.

6 Claims, 12 Drawing Sheets

OPTICALLY COMPENSATED BEND TYPE LIQUID CRYSTAL DISPLAY DEVICE

BACKGROUND OF THE INVENTION

1. Field of the Invention

The present invention relates to an OCB (Optically Compensated Bend)-type liquid crystal display device, and particularly relates to an OCB-type crystal display device with high serviceability, which inhibits disturbance of the orientation surface due to a circumferential electric field or irregularity of the orientation plane.

2. Background Art

Liquid crystal display devices have rapidly become prevalent because they can easily display a large volume of information, displacing CRT type display devices.

Conventionally, the twisted nematic mode (hereinafter, called TN mode) has been mainly used, in which the liquid crystal molecules are inserted between the upper and lower plates and are twist oriented by rotation of the molecular axis direction (hereinafter, called a director) by 90 degrees in plan view, and images are displayed by rotating the director in the vertical direction with respect to the substrates by a vertical electric field.

However, this TN mode has the problem that the angle of visibility is narrow. Accordingly, the TN mode has the problem not only in that images are not visible from an angle, but also in that, when the display screen becomes large as a result of progress in manufacturing large size screen, the clearness of images becomes different in the center and at edges of the screen, which results in non-homogeneous visibility. Although a technique to expand the angle of visibility by addition of a phase compensating plate is disclosed in Japanese Unexamined Patent Application, First Publication No. Hei 6-75116, it is difficult to completely compensate for the twist structure of the TN mode liquid crystal, and there is still demand for a solution of this problem.

In order to solve the problem of the small angle of visibility, attention has been given to a system, in which a phase compensating plate is applied to each bend oriented cell. The system in which the phase compensating plate is combined with the bend oriented cell is called OCB (optically compensated bend, or optically compensated birefringence, and the quick response speed of OCB devices is attracting considerable attention. An explanation of OCB devices is as follows.

The OCB device has a structure in which bend oriented cells and phase compensating plates for compensating the phase of the liquid crystal layer are arranged between two substrates. There are various types of OCB devices that use various types of phase compensating plates. One type of OCB devices uses a phase compensating plate having a negative birefringence, the other device uses a biaxial phase compensating plate disclosed by Kuo in SID '94 Digest, and still another device uses a pair of upper and lower phase compensating plates having negative birefringence with a hybrid arrangement, which is disclosed in Japanese Unexamined Patent Application, First Publication No. Hei 10-197862.

The liquid crystal cell used in the OCB devices is formed by inserting liquid crystal between two substrates, the opposing surfaces of which are orientation treated in one direction, and the liquid crystal Lc is oriented at the interface of the substrate surfaces with a tilt angle range $(\theta, -\theta)$. When no electric field is applied to the liquid crystal cell in the above state, the tilt angle decreases to zero towards the center of the liquid cell. The tilt angle is reduced towards the center and the tile angle becomes zero at the center of the cell gap, where the liquid crystal molecules are oriented in parallel to both upper and lower substrates (this state is called a spray orientation). If the liquid crystal molecules are arranged in the above-described orientation, the desired wider angle of visibility is not obtainable. In the OCB mode, it is necessary for the liquid crystal by, for example, the application of a high voltage to the cell gap, to be rearranged in an arcuate structure (this state is called a bend arrangement), wherein the liquid crystal molecules at the center of the cell gap stand up and the tilt angle of the liquid crystal molecules at the interface with the substrate becomes zero.

In the OCB mode, the display is operated by controlling the tilt angle of liquid crystal molecules not located at the center of the cell gap, while the liquid crystal molecules at the center of the cell gap are maintained in the standing state. For example, when the phase compensating plate is arranged to conform with a dark representation of the display when the tilt angle of the liquid crystal molecules not located at the gap center is small (reclined), while the liquid crystal molecules at the gap center are standing as shown in FIG. 17A, the bright representation is obtained when the tilt angle of the liquid crystal molecules not located at the gap center is large (standing) while the liquid crystal molecules at the gap center are also standing as shown in FIG. 17B.

However, problems arise when the bend-type orientation is applied to active matrix liquid crystal display devices.

The first problem is that the liquid crystal molecules oriented in the bend-type orientation is liable to be affected by nearby electric fields parasitically generated between the pixel electrodes and wiring. For example, when a potential difference is generated between a pixel electrode on a particular pixel region and the signal line adjacent to the pixel electrode on a active matrix substrate, this potential difference generates an electric field in the liquid crystal layer parallel to the substrate, which causes the liquid crystal molecules in the region where the liquid crystal orientation is affected by the electric field to rotate and the liquid crystal in this region in the bend-type orientation is converted into a twist-type orientation. When the liquid crystal is converted to a twist orientation, standing of the liquid crystal molecules is suppressed and it becomes difficult to rearrange them in the bend orientation. Since the desired birefringence cannot be obtained in the area where the bend orientation is deformed, the image quality declines. When an orientation core is formed, even locally, in the pixel area in question, this orientation tendency propagates due to the liquid crystal characteristics, which also causes degradation of the image quality by disturbing the liquid crystal arrangement.

The other problem of the bend type orientation is that the liquid crystal molecules near the substrate are liable to be affected by irregularity of the substrate surface. In general, on the substrate surface, a number of irregular portions are present due to thin film transistors or protective insulating layers formed on the substrate by repeated lamination and etching. The liquid crystal layers tend to orient along the slopes of the irregularity, and the tilt angles of some liquid crystal molecules turn to the opposite direction to the normal orientation, which is called the reversed tilt phenomenon, and thus the bend orientation is disturbed.

As described above, in order to apply the bend type orientation mode to the active matrix liquid crystal display, disturbance of the bend type liquid crystal orientation caused by the nearby electric field or the irregularity of the substrate surface must be securely excluded.

SUMMARY OF THE INVENTION

It is therefore an object of the present invention to provide a liquid crystal display, in which the bend-type liquid crystal orientation mode is not disturbed by a horizontal electric field or irregularities of the substrate surface.

The present invention provides a liquid crystal display device defining a rectangular pixel region defined by a plurality of scanning lines arranged in parallel and a plurality of signal lines crossing the scanning lines, in which a liquid crystal is inserted between two facing substrates comprised of an active matrix substrate including pixel electrodes and thin film transistors and the other one is a transparent substrate including common electrodes, and the opposing surfaces of the active matrix substrate and the transparent substrate are orientation treated in the same direction, wherein the orientation direction is limited within ±45° for the short side direction of the pixel region.

In the above structure, it is preferable for the signal lines to extend along the direction of the long side of the pixel region.

In general, the pixel region of a color liquid crystal display device is formed in a rectangular shape, and pixel regions having color filters of red, green, and blue are sequentially formed along the scanning lines in the short side of the pixel region. Thus, the signal lines extend along the long side direction of the pixel region. In this case, an nearby electric field is generated in between the surrounding wiring and the pixel electrodes. The size of the area where the nearby electric field is generated is apparently larger in the long side direction than that in the short side direction. Accordingly, the effect of the electric field on the liquid crystal molecules is larger along the long side direction than that along the short axis direction. In the liquid crystal display device of the present invention, since both substrates are orientation treated in the same direction and since the orientation direction is within ±45 degrees of the short side of the pixel region, when no voltage is applied between the pixel electrode and the common electrode, the liquid crystal molecules are oriented in the parallel or close to the parallel direction to the short side of the pixel region.

Under these conditions, when a potential difference is generated between the pixel region and the signal lines, the lines of force of the horizontal electric field generated by this potential difference points to the short side of the pixel region. Accordingly, the force line tends to be parallel or semi-parallel to the orientation direction of the liquid crystal molecules and generation of the twisted orientation core by the nearby electric field around the long axis of the pixel region can be suppressed. In the liquid crystal display device, since the directions of the short sides of all pixel regions are the same, and since the liquid crystal molecules are arranged within ±45 degrees to the short axis direction of the pixel, the liquid crystal molecules are oriented in parallel or close to parallel to the short axis of the pixel when no voltage is applied between the pixel electrode and the common electrode.

The present invention provides a liquid crystal display device, assembled by facing an active matrix substrate, which comprises a plurality of rectangular pixel regions, each of which is surrounded by one of a plurality of a scanning lines arranged in parallel and one of a plurality of signal lines crossing said plurality of scanning lines through an insulating layer and each of which comprises a pixel electrode and a thin film transistor, and a transparent substrate provided with a common electrode, inserting a liquid crystal therebetween, and the opposing surface of the active matrix substrate and the opposing surface of the transparent substrate are treated so as to have the same orientation direction, wherein the pixel electrode is formed in a layer located closer to the common electrode than the signal lines and the scanning lines.

The change from the spray orientation to the bend orientation is induced by the vertical electric field generated between the pixel electrode and the common electrode. At this time, when the distance between the signal lines and the common electrode is longer than the distance between the pixel electrode and the common electrode, the electric field generated between the surrounding wiring and the pixel electrode is hard to be effused into the liquid crystal layer, so that the bend-type orientation is hard to disturb. In order to arrange the pixel electrode at a closer position to the common electrode than the positions of the signal and scanning lines to the common electrode, an insulating layer is formed between the signal and scanning lines and the pixel electrode.

In the above structure, the end portions of the pixel electrode preferably overlap with the end portions of the signal and scanning lines through an insulating layer.

The electric field generated between the pixel electrode and the signal and 15 scanning lines is generated mainly from an origin located at respective end portions. Accordingly, if the end portions of the pixel electrode overlap through an insulating layer with the end portions of the signal and scanning lines, since the electric field generated between the pixel electrode and the signal and scanning lines is generated at the rear side of the pixel electrode, the effect of the vertical electric field is further reduced.

The present invention further provides a liquid crystal display device, assembled by opposing an active matrix substrate, which comprises a plurality of rectangular pixel regions, each of which is surrounded by one of a plurality of a scanning lines arranged in parallel and one of a plurality of signal lines crossing said plurality of scanning lines through an insulating layer and each of which comprises a pixel electrode and a thin film transistor, and a transparent substrate provided with a common electrode, inserting a liquid crystal therebetween, and the opposing surface of the active matrix substrate and the opposing surface of the transparent substrate are treated so as to have the same orientation directions, wherein a compensation electrode, which is capable of generating an electric field between said signal line or the scanning line, is formed in the same layer as that of the scanning line or the signal line between the scanning line and the signal line of said pixel.

In this liquid crystal display device, since the compensation electrode is formed in the same layer as the scanning line or the signal line, the force lines of the electric field generated from the scanning line or the signal line are absorbed by the compensation electrode, so that no effect is exerted on the liquid crystal layer and the orientation of the liquid crystal layer molecules is not disturbed. The compensation electrode is preferably formed so as to partially overlap with the pixel electrode. Thereby, the force lines of the electric field generated between the compensation electrode and the pixel electrode wrap around the rear side of the pixel electrode, which further reduces the effect on the liquid crystal molecules. Since it is preferable to maintain the potential of the compensation electrode equal to that of the common electrode, the compensation electrode is preferably connected to the common electrode or to the common wiring, maintained at the same potential as the common electrode.

The present invention further provides a liquid crystal display device, assembled by opposing an active matrix substrate, which comprises a plurality of rectangular pixel regions, each of which is surrounded by one of a plurality of a scanning lines arranged in parallel and one of a plurality of signal lines crossing said plurality of scanning lines through an insulating layer and each of which comprises a pixel electrode and a thin film transistor, and a transparent substrate provided with a common electrode, and the opposing surface of the active matrix substrate and the opposing surface of the transparent substrate are treated so as to have the same orientation directions, wherein, the opposing surface of said active matrix substrate is formed into a flat surface.

The tilt angle of the liquid crystal molecules is liable to be affected by irregularities of the substrate surface. That is, if the substrate surface is inclined in the direction opposite to the tilt angle, the liquid crystal molecules will be oriented in undesirable directions, which may disturb the normal bend-type orientation of the liquid crystal molecules. If irregularities of the opposing surface of the active matrix substrate, formed by repeated lamination and etching, can be eliminated and a flat and smooth surface is obtained, tilting of the liquid crystal molecules in the undesirable direction can be prevented and the normal bend-type orientation can be obtained. The flat and smooth surface can be provided by formation of a thick organic insulating film.

The present invention provides a liquid crystal display device, assembled by opposing an active matrix substrate, which comprises a plurality of rectangular pixel regions, each of which is surrounded by one of a plurality of a scanning lines arranged in parallel and one of a plurality of signal lines crossing said plurality of scanning lines through an insulating layer and each of which comprises a pixel electrode and a thin film transistor, and a transparent substrate provided with a common electrode, and the opposing surface of the active matrix substrate and the opposing surface of the transparent substrate are treated so as to have the same orientation directions, wherein the opposing surface of the active matrix substrate and the opposing surface of the transparent substrate are inclined in the opposite direction to each other along the orientation direction.

The liquid crystal molecules in the vicinity of the substrate surface tilt following the inclination direction of the substrate surface. In the bend-type orientation, when in a non-voltage application mode, that is, when no voltage is applied to the liquid crystal, the liquid crystal molecules near the active matrix substrate and the liquid crystal molecules near the transparent substrate must be oriented into the opposite direction. If the opposing surfaces of both substrates incline in directions opposite to each other, the liquid crystal molecules near the opposing surfaces will tilt in the opposite directions along the oppositely inclined substrate surfaces and the liquid crystal molecules near both substrate surfaces form cores which induce the liquid crystal molecules to form the bend-type orientation.

The present invention also provides a liquid crystal display device, formed by facing an active matrix substrate, which comprises a plurality of rectangular pixel regions, each of which is surrounded by one of a plurality of a scanning lines arranged in parallel and one of a plurality of signal lines crossing said plurality of scanning lines through an insulating layer and each of which comprises a pixel electrode and a thin film transistor, and a transparent substrate provided with a common electrode, and the opposing surface of the active matrix substrate and the opposing surface of the transparent substrate are treated so as to have the same orientation directions, wherein, the opposing surface of the active matrix substrate and the opposing surface of the transparent substrate are inclined such that the gap width formed by both opposing surfaces along the orientation direction is V-shaped, which is wide at the center and narrow at both ends of the pixel region.

In this liquid crystal display device, since the active matrix substrate and the transparent substrate define the pixel region, each of these surfaces is formed such that the gap width is narrow at the end portion and wide at the center, so that the liquid crystal molecules tilt in the opposite directions at both end portions along the orientation direction. Thereby, the visual field angle dependence of the light shielding property of the display device decreases, which results in improving the visual field angle and the image contrast.

BRIEF DESCRIPTION OF THE DRAWINGS

FIG. 3A and 3B are cross-sectional views showing liquid crystal molecules in non-operational and operational modes, wherein FIG. 3A represents in the state in which no voltage is applied, and 3B represents the state in which a voltage is applied.

DETAILED DESCRIPTION OF THE INVENTION

The present invention is explained in detail hereinafter by describing several embodiments. It is noted, however, that this invention is not limited to these embodiments.

[First Embodiment]

Figure 1:
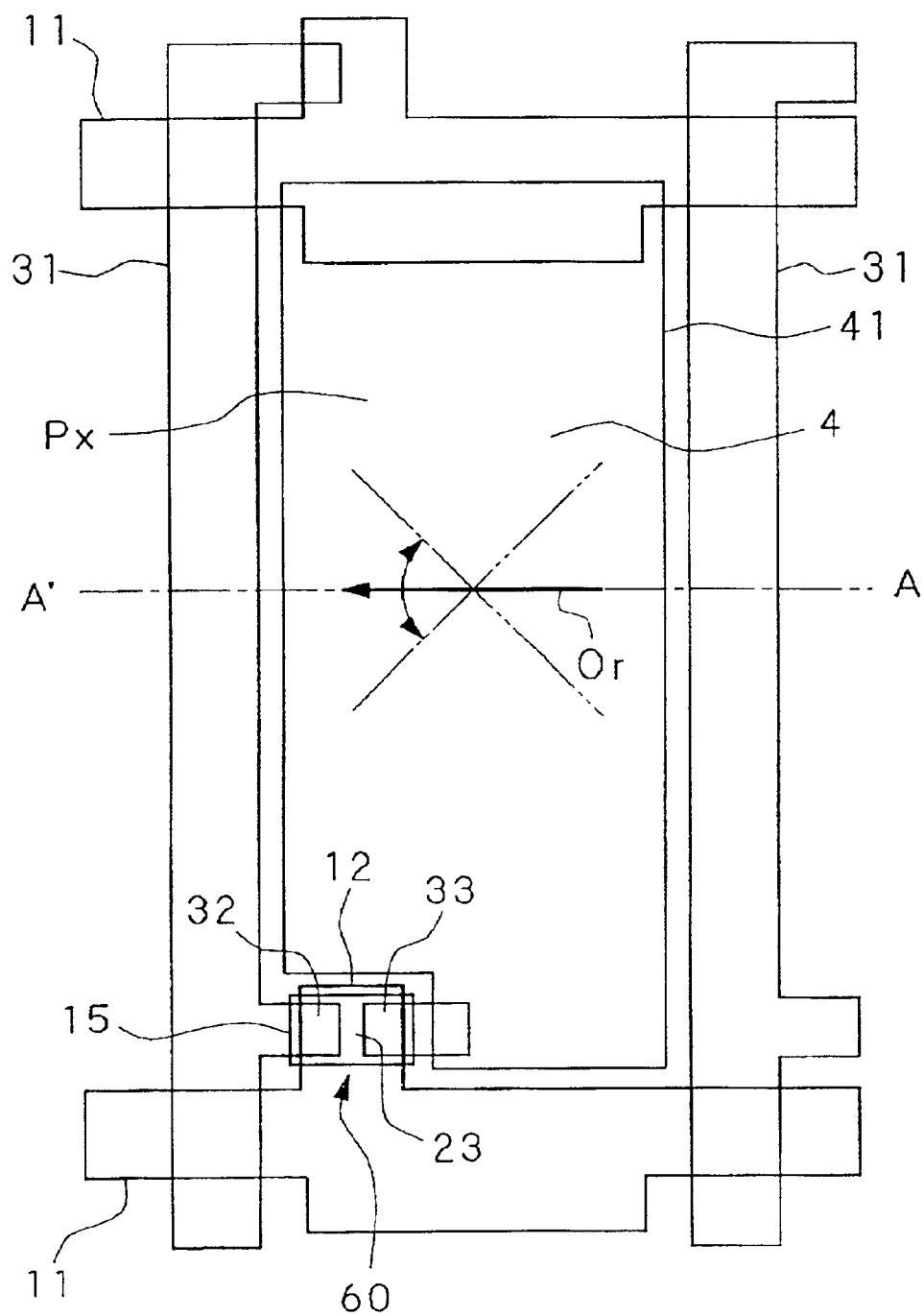
FIG. 1 is a perspective plan view showing the pixel region according to the first embodiment of the present invention.
Figure 2:
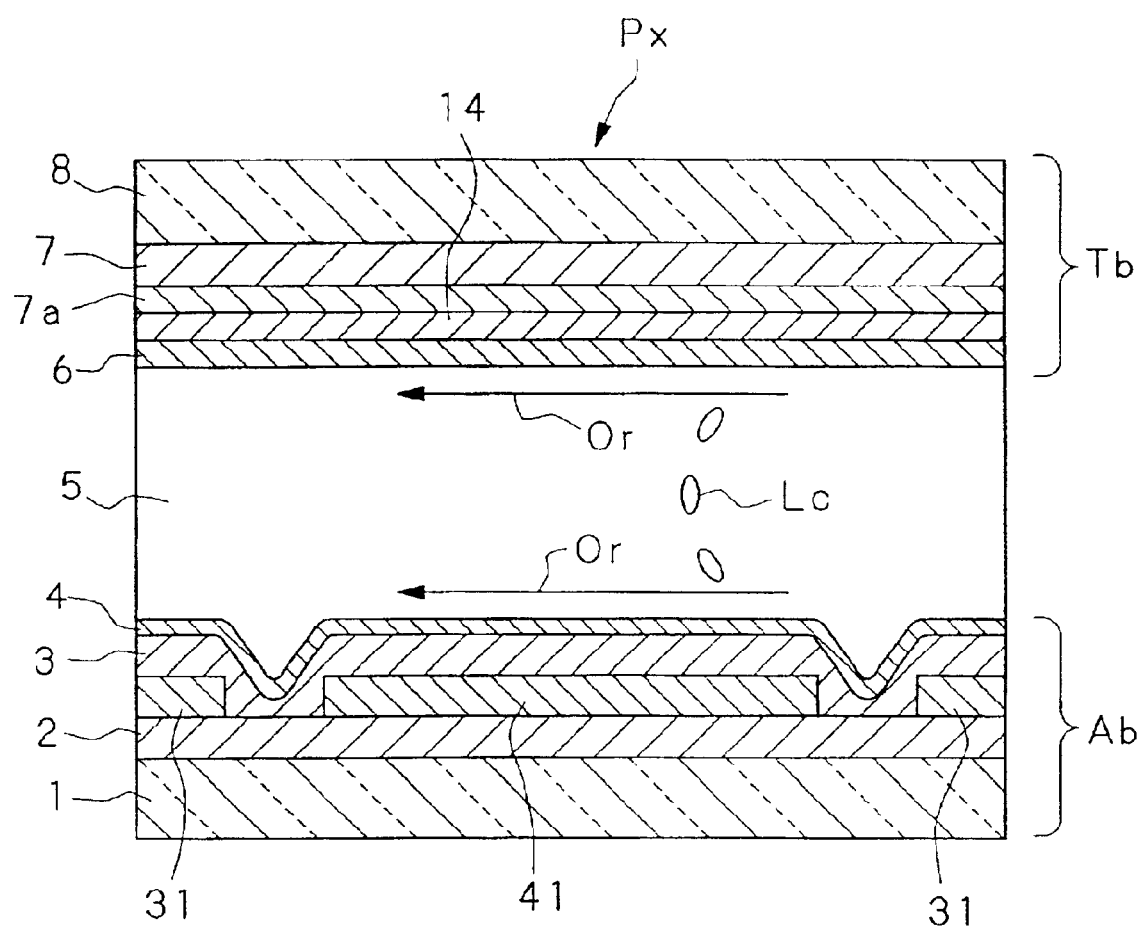
FIG. 2 is a cross-sectional view along A–A' line of FIG. 1.

FIG. 1 is a perspective plan view showing the pixel region according to the first embodiment of the present invention and FIG. 2 is a cross-sectional view along the A–A' line of FIG. 1.

The liquid crystal display device according to the first embodiment of the present invention comprises a plurality of scanning lines 11 arranged on a substrate 1 and a plurality of signal lines 31 formed on the scanning lines crossing through a gate insulating layer 2, the scanning lines 11 and the signal lines 31 forming a matrix, and thin film transistors and pixel electrodes 41 are formed at the crossing portions of the matrix, constituting the pixel regions.

The thin film transistor comprises a gate electrodes 12, electrically connected to the scanning lines mounted on the thin film transistor substrate Ab, a gate insulating layer 2 formed so as to cover the gate electrode 12, an amorphous silicon layer (hereinafter, called a-Si layer) 15, a drain electrode 32 electrically connected to the signal lines 4, a source electrode 33 formed at the opposite side across the channel gap 23 in the same layer as that of the drain electrode 32, an n+ type amorphous silicon layer (not illustrated), doped with a high concentration of n-type impurity, and formed between the source electrode 33 and the a-Si layer 15, and a protective insulating layer 3 formed so as to cover said n+ type amorphous silicon layer. Here, the n+ type amorphous silicon layer is formed to form ohmic contact between the a-Si layer and the drain electrode or the source electrode. The protective insulating layer 3 is used for preventing the impurity from penetrating into the thin film transistor.

The pixel electrode 41 is formed by a transparent conductive film on the gate insulating layer 2, is electrically connected to the source electrode 33, and is formed in the same layer as that of the signal electrode 31 formed as being sandwiched between the gate insulating layer 2 and the protective insulating layer 3.

On the active matrix substrate Ab, an orientation film 4 is formed for controlling the orientation of the liquid crystal molecules near the interface. As shown in FIG. 1, this orientation film 4 is formed so as to orient in the short axis direction of the pixel region Px.

Furthermore, another substrate Tb, having color filters 7, common electrodes 14, and an orientation film is disposed facing to the thin film transistor substrate Ab for forming the active matrix liquid crystal display device. The orientation film 6 is orientation treated in the direction parallel to the orientation film 4 in the short axis direction of the pixel region Px. The liquid crystal Lc is filled in the cell gap formed between the substrate Tb and the thin film transistor substrate Ab, so as to form the liquid crystal display device.

Below, the manufacturing method of the above liquid crystal display device is described.

A chromium film having a thickness of 0.2 μm is formed on a substrate 1 by a sputtering method, and scanning lines 11 and gate electrodes 12 are formed by patterning the chromium film by photolithography. It is noted that, although the chromium is described as above, the other metal materials, having low electric resistivities and which can be patterned by photolithography, such as molybdenum, titanium, aluminum, aluminum alloys may be used. In addition, the scanning lines 11 and the gate electrode 12 may be formed not only by the chromium film but also by the composite film laminated with a barrier metal of titanium on the chromium film. Subsequently, a silicon nitride film with a thickness of 0.5 μm is formed as the gate insulating layer 2 by chemical vapor deposition (hereinafter, called CVD). On the gate insulating layer 2, an undoped A-Si layer and n+ type a-Si are formed by CVD for forming an a-Si film 15 by patterning these CVD films. Here, the a-Si film is used as an active layer of the transistor, and the n+ type a-Si is used for ensuring ohmic contact between the drain electrode 32 and the source electrode 33.

Subsequently, contact holes for electrically connecting the signal lines, the source electrode, and the drain electrode with the conductive layer for forming the pixel electrodes are formed by patterning the gate insulating layer 2. It may not be necessary to form contact holes. It may be possible to provide conductivity in ways other than the use of contact holes. Subsequently, a chromium film with a thickness of 0.2 μm is formed on the a-Si film 15 and the n+ type a-Si 16 and the signal lines 31, the drain electrode, and the source electrode are formed by sputtering the chromium film. Although the chromium film is used for forming the signal lines, it is possible, as for the scanning lines, to use other metals such as molybdenum, titanium, aluminum, and aluminum alloy, when the metals have low resistivity and can be patterned by. photolithography. In addition, the scanning lines 11 and the gate electrode 12 may be formed not only by the chromium film but also by a composite film laminated with a baffler metal of titanium on the chromium film.

Subsequently, pixel electrodes are formed by forming and patterning indium-tin oxide film (hereinafter, called ITO film) having a thickness of 0.1 μm. Subsequently, a dry etching process is executed by use of a type of gas which can etch the n+ type a-Si film, for removing the n+ type a-Si located between the drain electrode 32 and the source electrode 33. This is for preventing a current from flowing between the source electrode and the drain electrode through the n+ type a-Si. Then, a silicon nitride film with a thickness of 0.2 μm is formed by CVD, and the protective insulating layer 3 is formed by patterning the silicon nitride film. The protective insulating film 3 prevents malfunction of the thin film transistor by suppressing migration of impurities into the a-Si layer 15. The orientation film 4 is then formed by printing a film made of polyimide, and, after firing at 220° C., the orientation treatment is executed in the short axis direction of the pixel region by the rubbing method. The active matrix substrate Ab is obtained by the above-described processes.

It is noted that the thickness of each film is not limited to the values described above, and it is possible to modify the thickness of each film depending upon the materials of the film, the size of the display device, and performance of the thin film transistors.

On another substrate 8, color filters and light shielding layers (not illustrated) are formed. The color filters and the light shielding layers may be formed by forming and patterning resist films composed of red, green, and blue pigments dispersed in an acrylic photosensitive polymer by photolithography. The metal film may be used as the light shielding films. The overcoat layer 7a is formed on these color filters and the light shielding layers and a common electrode 14 is then formed by forming the ITO film in the thickness of 0.1 μm on the color layers and by patterning the ITO film. An orientation film is formed by printing a film made of polyimide and, after firing at 220° C., the orientation treatment is executed so as to orient the orientation film in parallel to the orientation direction of the orientation film 4 by a rubbing method. The transparent substrate Tb is thus formed as described above.

Polymer beads (not illustrated) having a diameter corresponding to the gap formed between the active matrix substrate Ab and the transparent substrate Tb are dispersed throughout the entire gap area, and the transparent substrate Tb is placed on the active matrix substrate Ab so that they face each other and both substrates are bonded at the periphery, and the nematic liquid crystal is injected between two substrates. The liquid crystal display device is obtained by the above process.

Figure 3A:
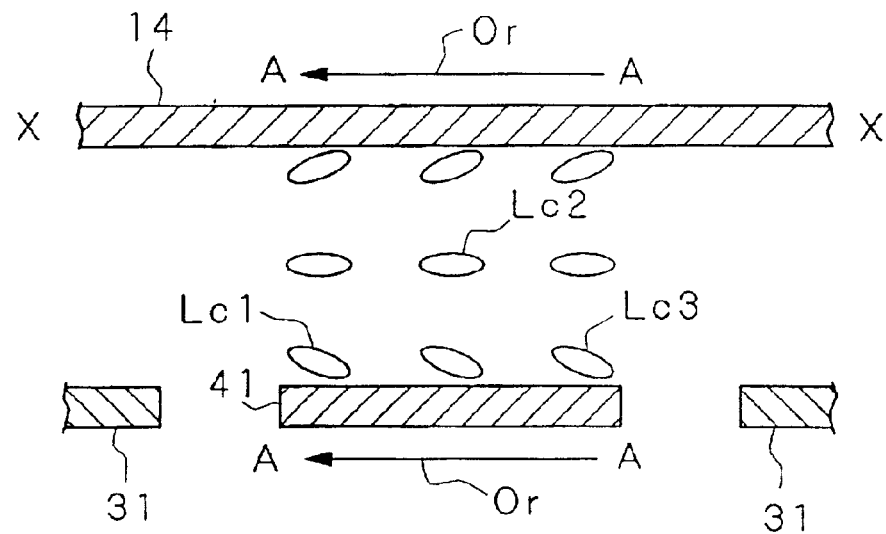
Figure 3B:
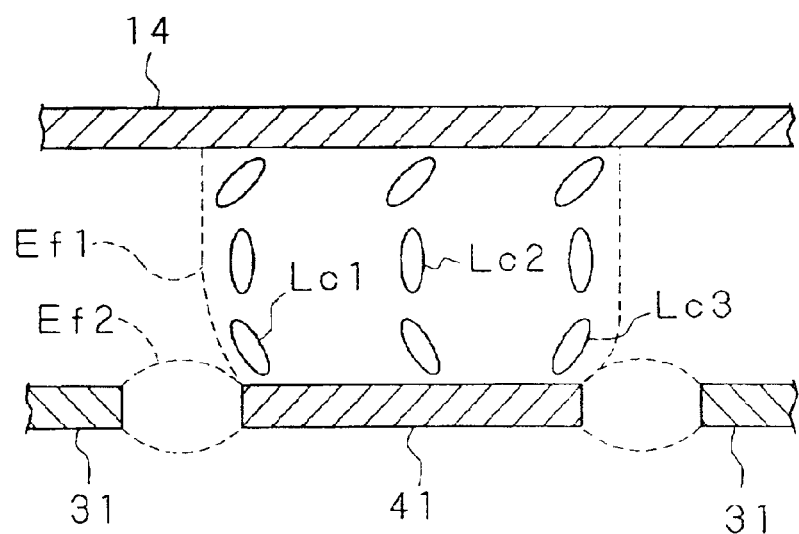

As schematically shown in FIG. 3A, in the liquid crystal display device, since the pixel electrode 41 and the common electrode 14 are both oriented in parallel to the short side axis A–A', the liquid crystal molecules are oriented arranged in the direction of the short side axis A–A' in the non application mode. When a voltage is applied to the space between the pixel electrodes 41 and the common electrode 14, an electric field Ef1 is generated vertically between the pixel electrodes and the common electrode 14.

Further, a potential difference is generated between the signal lines 31 and the pixel electrode 41, which is a parasitic potential which is not originally desired. Since the signal lines 31 and the pixel electrodes 41 are arranged horizontally on the same layer, the electric field Ef2 generated by this potential difference is a horizontal electric field, and the directions of the force lines coincide with the short side axis A–A', that is, the orientation direction Or of the liquid crystal molecules. Accordingly, this horizontal electric field Ef2 does not change the liquid crystal molecules into a twisted orientation before the liquid crystal molecules change to the bend-type application mode. Thus, by arranging the orientation directions Or of both substrates facing each other to tend toward the short side axis A–A7, the effect of the horizontal electric field on the liquid crystal molecules can be avoided. A similar effect can be obtained when the liquid crystal is oriented in the inverted direction by rotating 180 degrees. Practically, this effect can be realized when the orientation tends toward a direction within ±45 degrees of the short side of the pixel region. Accordingly, a parasitic horizontal electric field is generated between the scanning lines and the pixel electrodes. However, since the length of each scanning line facing the pixel electrode is small (that is, since the scanning lines face to the pixel electrode in the direction of the short side axis), the effect of the parasitic electric field is small. In addition, in this constitution, which is described later, since the scanning lines are formed in a lower layer than the layer of the pixel electrode, the parasitic electric field will not penetrate too much into the cell gap.

Further, the force line of this electric field Ef1 gradually expands from the end of the pixel electrode 41 towards the common electrode 14 in a U-shape. At this time, liquid crystal molecules Lc1 and Lc3 in the vicinity of the pixel electrode 41 are excited by the electric field Ef1, change their tilt angles, and change into the bend-type application mode. When the orientation core of the bend-type application mode is formed in at least one end, this orientation propagates to the entire pixel region, and the liquid crystal molecules, Lc1, Lc2, Lc3, . . . are converted into the bend-type application mode in sequence. Thereby, the region in the twisted orientation due to the horizontal electric field can be reduced, and good image quality can be obtained.

[Second Embodiment]

Figure 4:
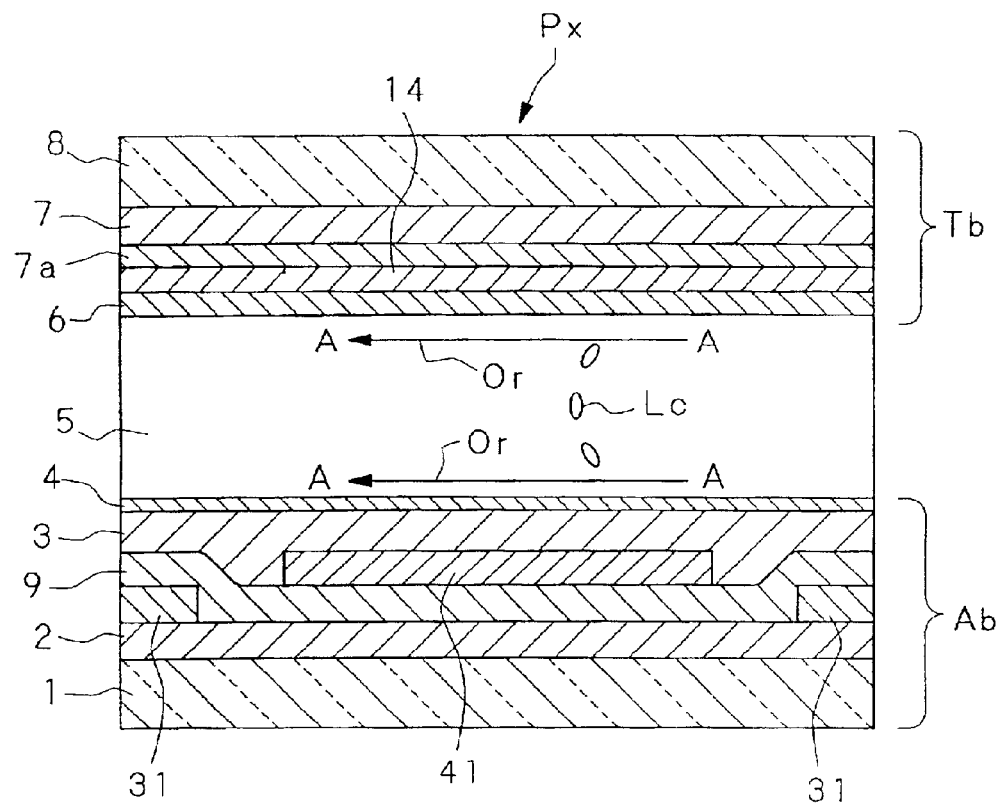
FIG. 4 is a cross-sectional view along the A–A' line in FIG. 14.
Figure 14:
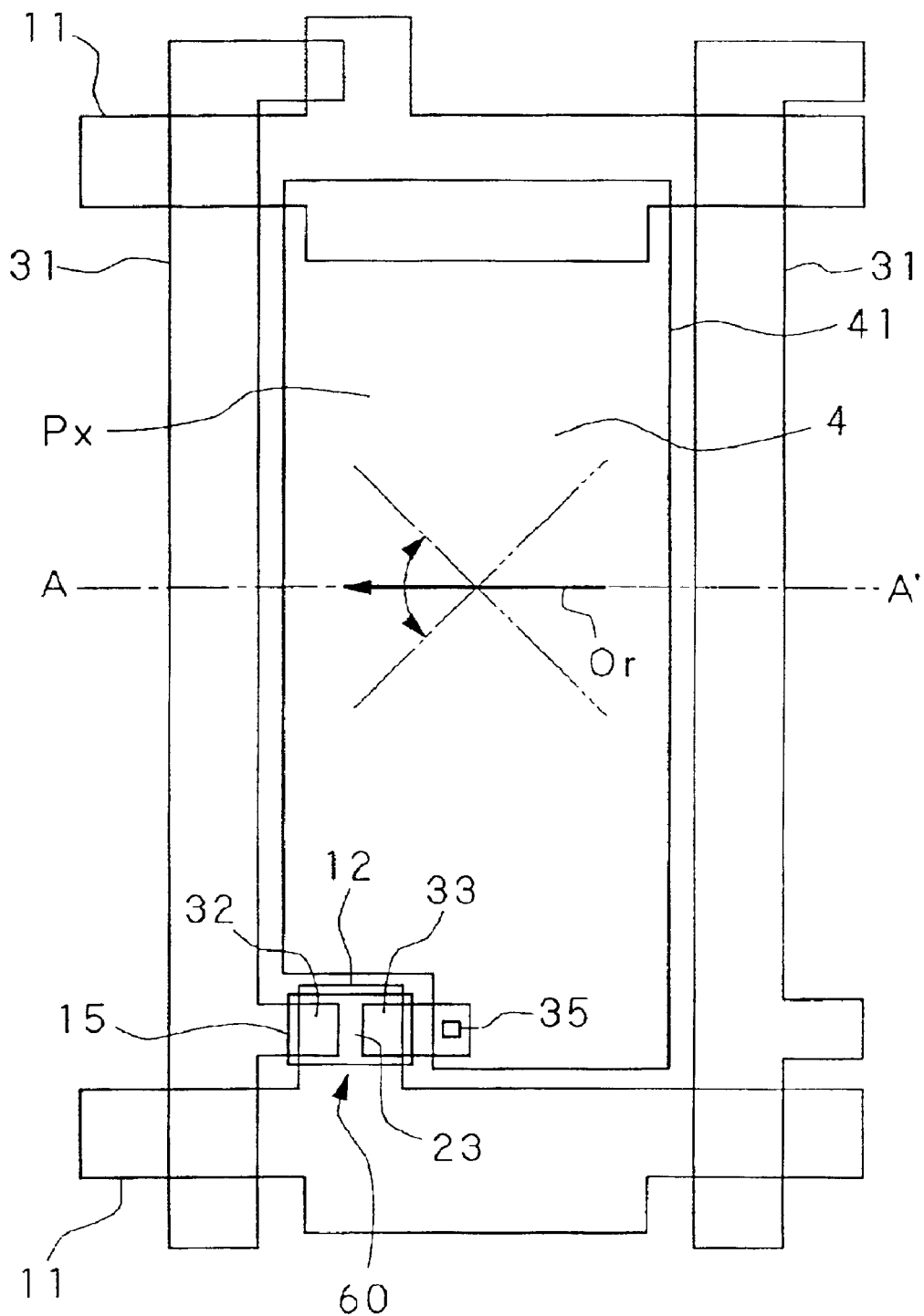
FIG. 14 is a cross-sectional view of the pixel region according to the seventh embodiment of the present invention.

FIG. 14 is a perspective plan view showing a pixel region Px of an active matrix-type liquid crystal display device according to the second embodiment of the color liquid crystal display device. FIG. 4 is a cross-sectional view of the pixel region along the A–A' direction.

The liquid crystal display device according to the second embodiment comprises a plurality of scanning lines 11 formed on a substrate 1 including thin film transistors and a plurality of signal lines 31, arranged so as to form a matrix with the plurality of scanning lines through a gate insulating layer 2, and thin film transistors and pixel electrodes arranged at intersection portions of the scanning lines and the signal lines for forming pixel regions.

The thin film transistors are formed in the same structure as that described in the first embodiment.

The pixel electrodes 41 are formed using the transparent conductive film on the upper layer of the scanning lines and the signal lines through an intermediate insulating layer 9, and are connected to the source electrode through the contact portion 35. The rest of the constitution is the same as that of the first embodiment.

Next, a manufacturing method for the above liquid crystal display device will be described hereinafter.

Similar to the first embodiment, the scanning lines 3 and the gate electrode 12 are formed by forming a chromium film with a thickness of 0.2 $\mu$m and by patterning by the photolithographic technique. Then, the silicon nitride film for forming the gate insulating layer 2 is deposited at a thickness of 0.5 $\mu$m. On the gate insulating layer 2, an undoped a-Si and an n+-type a-Si layer are deposited by CVD, and by patterning these layers, the a-Si layers 15 are formed. Subsequently, contact holes are formed by patterning the gate insulating layer 2 in order to conductively connect the conductive layer including the scanning lines 11 and the conductive layer including the signal lines, the source electrodes, and drain electrodes, which are formed in a later process. These contact holes are formed when they are necessary. The conduction may be obtained by other methods. Subsequently, a chromium film with a thickness of 0.2 $\mu$m is formed by sputtering on the a-Si layer 15 and the n+-type a-Si layer and, by patterning, the signal lines 31, drain electrodes 32, and source electrodes 33 are formed. Subsequently, dry etching is executed using a gas, which is capable of etching the n+-type a-Si, for. removing the n+-type a-Si layer located between the drain electrodes 32 and the source electrodes 33. Subsequently, the silicon nitride film is formed by CVD with a thickness of 0.2 $\mu$m for forming the intermediate insulating layer 9. The intermediate insulating layer 9 not only functions as the intermediate layer between the layer including the pixel electrodes and the layer including signal lines etc., but also functions as a protective insulating layer 3 as described in the first embodiment for preventing impurity ions from penetrating in the a-Si layer and prevents the thin fun transistors from causing a malfunction. Subsequently, the orientation film made of polyimide resin is formed by a printing method, and after firing at 220° C., the orientation film is orientation treated in the short side direction by a rubbing process.

It is noted, however, that the thicknesses of these films are not limited to the values described above, and modifications thereof may be used depending upon the film material, the display device size, and the thin film transistor performance.

The active matrix substrate Ab is thus obtained by the above process.

Furthermore, the transparent substrate Tb is formed according to the same process shown in the first embodiment. The polymer beads having a diameter corresponding to the gap between the active matrix substrate Ab and the transparent substrate Tb are scattered over the entire area of the substrate, both substrates are piled up such that both orientation films face each other, the rim is adhered, and the nematic liquid crystal is injected into the gap between the substrates. The liquid crystal display is obtained by the above-described manufacturing method.

Figure 5:
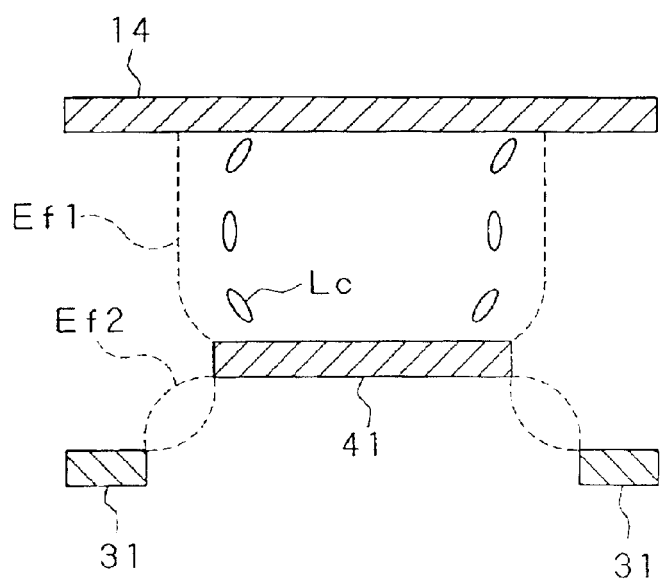
FIG. 5 is a schematic cross-sectional view showing a behavior of the liquid crystal molecules in the liquid crystal display device.

This color liquid crystal display device is, as schematically shown in FIG. 5, constituted such that the pixel electrodes 41 are formed in a closer layer than that of the signal lines 31. Thus, even when the electric field Ef2 is generated by a potential difference Ef2 between the signal lines 31 and pixel electrodes 41, the direction of the force line tends to be downward, so that the electric field Ef2 does not affect the force line of the electric field Ef1 formed between the pixel electrode 41 and the common electrode 14. The same effect is obtained for the pixel electrode and the scanning lines. Accordingly, the bend-type orientation is not disturbed regardless of the direction of orientation of the liquid crystal molecules.

[Third Embodiment]

Figure 6:
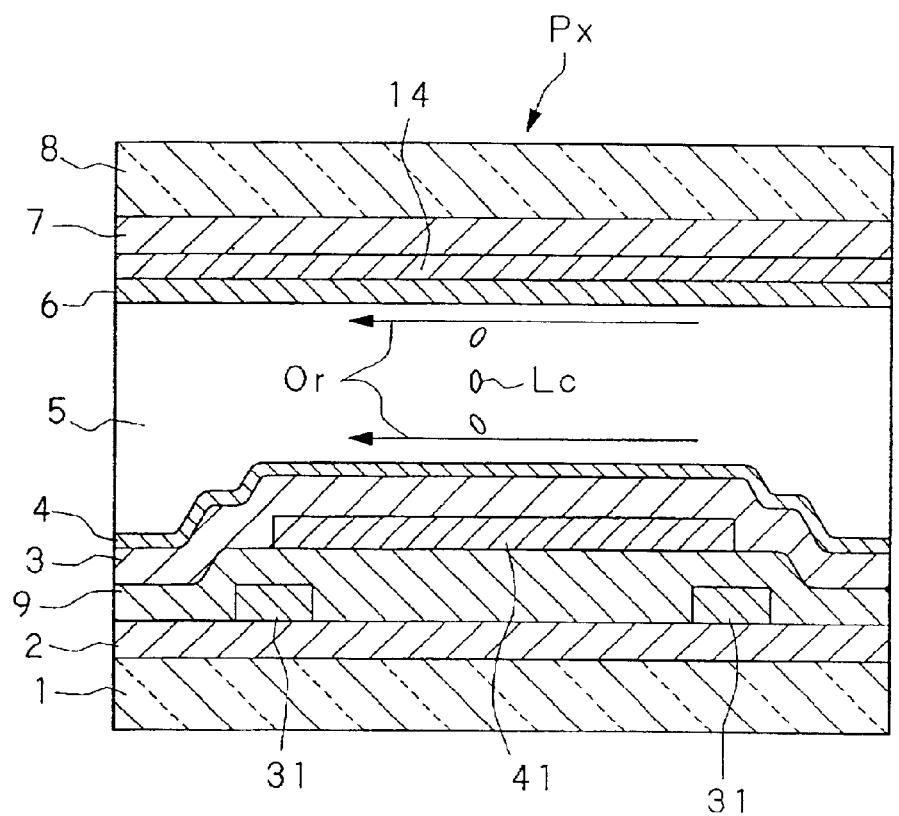
FIG. 6 is a cross-sectional view of the pixel region according to the second embodiment of the present invention.

Although the third embodiment is approximately the same as the second embodiment, there is a difference in that, as shown in FIG. 6, the side portion of the pixel electrode 41 and the side portion of the signal lines 31 are partially overlapping through an intermediate insulating layer 9.

The manufacturing method of the present embodiment is similar to that of the second embodiment, except that it is preferable to form a thick intermediate insulating layer 9, because, in the present embodiment, the parasitic capacitance between the signal line and the pixel electrode increases. One method to form a thick insulating layer is to coat an organic material and to fire the coat. The thick insulating layer can also be formed by laminating the silicon nitride film and the organic film.

Figure 7:
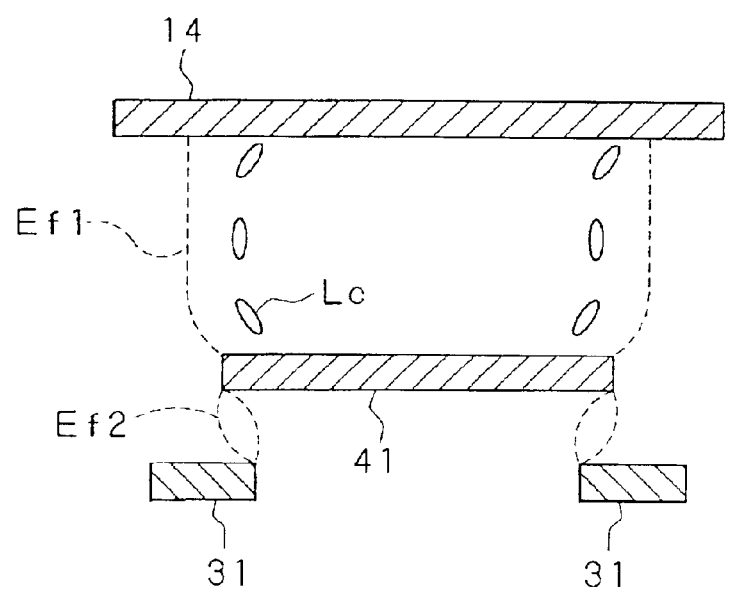
FIG. 7 is a cross-sectional view showing the behavior of the liquid crystal molecules in a liquid crystal device.

In this color liquid crystal display device according to this embodiment, as schematically shown in FIG. 7, since the layer including the pixel electrode 41 is formed closer to the common electrode 14 than the layer including the signal electrode and since the side portion of the pixel electrode 41 is partially overlapping with the side portion of the signal line 31, the force lines of the electric field Ef2 generated between the signal line 31 and the pixel electrode 41 are formed to the rear side of the pixel electrode 41 and do not affect the force line of the electric field Ef1 formed between the pixel electrode 41 and the common electrode 14. Accordingly, the bend-type orientation is not disturbed.

[Fourth Embodiment]

Figure 8:
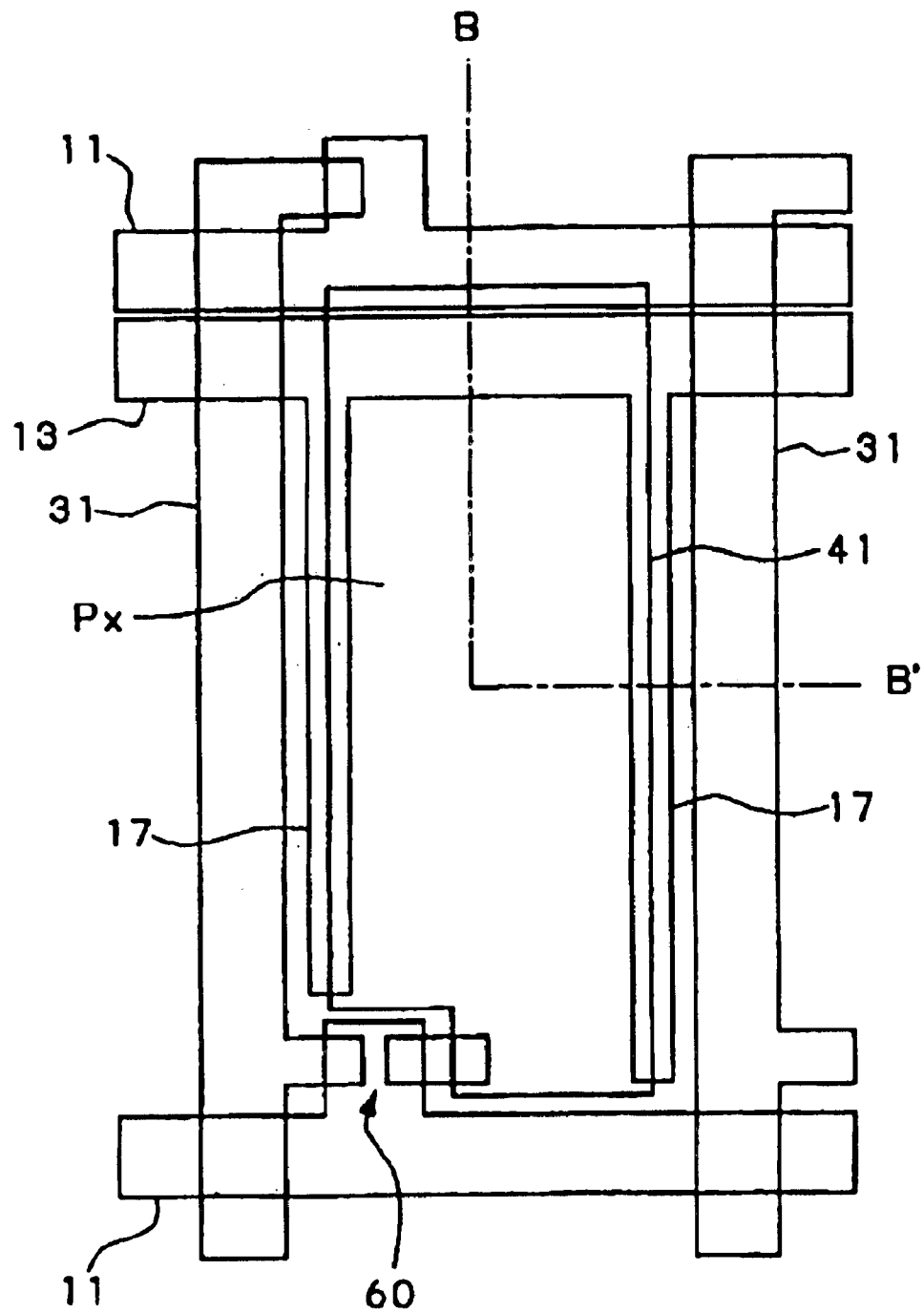
FIG. 8 is a perspective plan view of a pixel region according to the third embodiment of the present invention.
Figure 9:
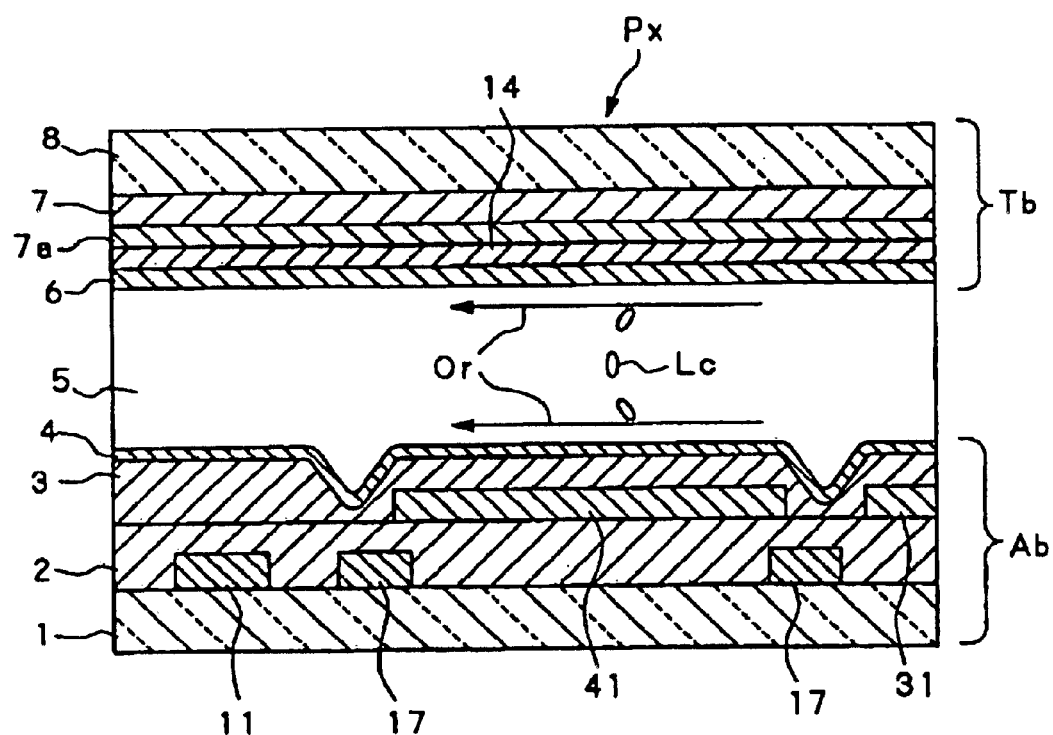
FIG. 9 is a cross-sectional view along the B–B' line of FIG. 8.

FIG. 8 is a perspective plan view of a pixel region Px of an active matrix-type liquid crystal display device according to the fourth embodiment of the color liquid crystal display device. FIG. 9 is a cross-sectional view of the pixel region Px along the short side axis B–B'.

The liquid crystal display device according to the fourth embodiment comprises a plurality of scanning lines arranged in a matrix form on the substrate including thin film transistors, a plurality of signal lines arranged so as to cross the scanning lines through the gate insulating film, and thin film transistors and pixel electrodes formed at respective intersections of the scanning lines and the signal lines for forming pixel regions.

The thin film transistors and pixel electrodes are formed similar to those in the first embodiment.

However, in the fourth embodiment, a compensation electrode 17 is formed extending from the common wiring 13 provided on the same layer as the scanning line 11 between the pixel electrode 41 of the pixel region Px and the signal line 31. It is noted that the same potential as that of the common electrode 14 is applied to the common wiring 13 and the compensation electrode 17.

The rest of the constitution is the same as that of the first embodiment.

Figure 10:
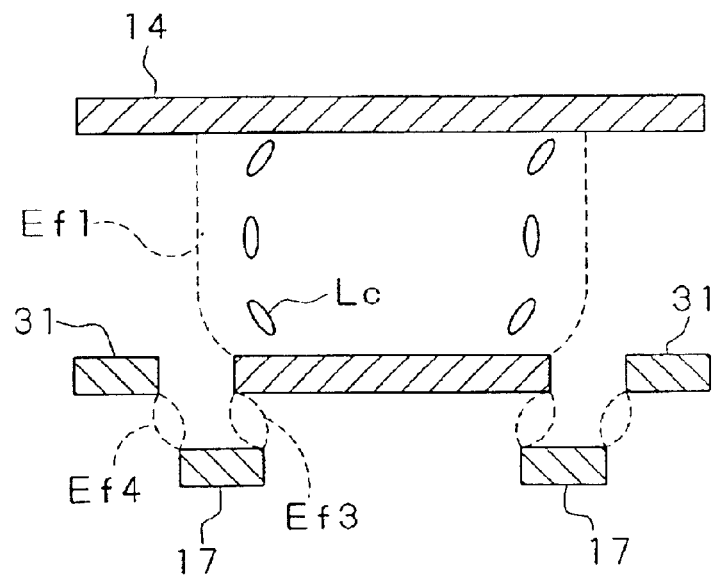
FIG. 10 is a cross-sectional view showing the behavior of liquid crystal molecules in the liquid crystal device.

In the color liquid crystal display device according to the present embodiment, the potentials applied to the common electrode 14 and compensation electrode 17 at the time of voltage application are approximately the same, and there is a difference between the potentials of the pixel electrode 41 and the signal line 31 when referred to the potential of the common electrode 14. Here, as schematically shown in FIG. 10, when a voltage is applied, the force lines of an electric field Ef1 are formed vertically between the pixel electrode 41 and the common electrode 14, and the force line of the electric field Ef3 between the pixel electrode 41 and the compensation electrode 17 and the force lines of an electric field Ef4 between the signal line 31 and the compensation electrode 17 are formed. These force lines of the electric fields Ef3 and Ef4 are formed below the pixel electrode, so that these force lines do not disturb the bend-type orientation of the liquid crystal molecules.

In addition, since the compensation electrode 17 is formed between the signal lines and the pixel electrode close to the substrate 1 and apart from the liquid crystal layer Lc, the electric field between the signal line and the pixel electrode converges on the compensation electrode and does not leak into the liquid crystal layer, and the electric field is not likely to cause the liquid crystal layer to be twisted.

Figure 15:
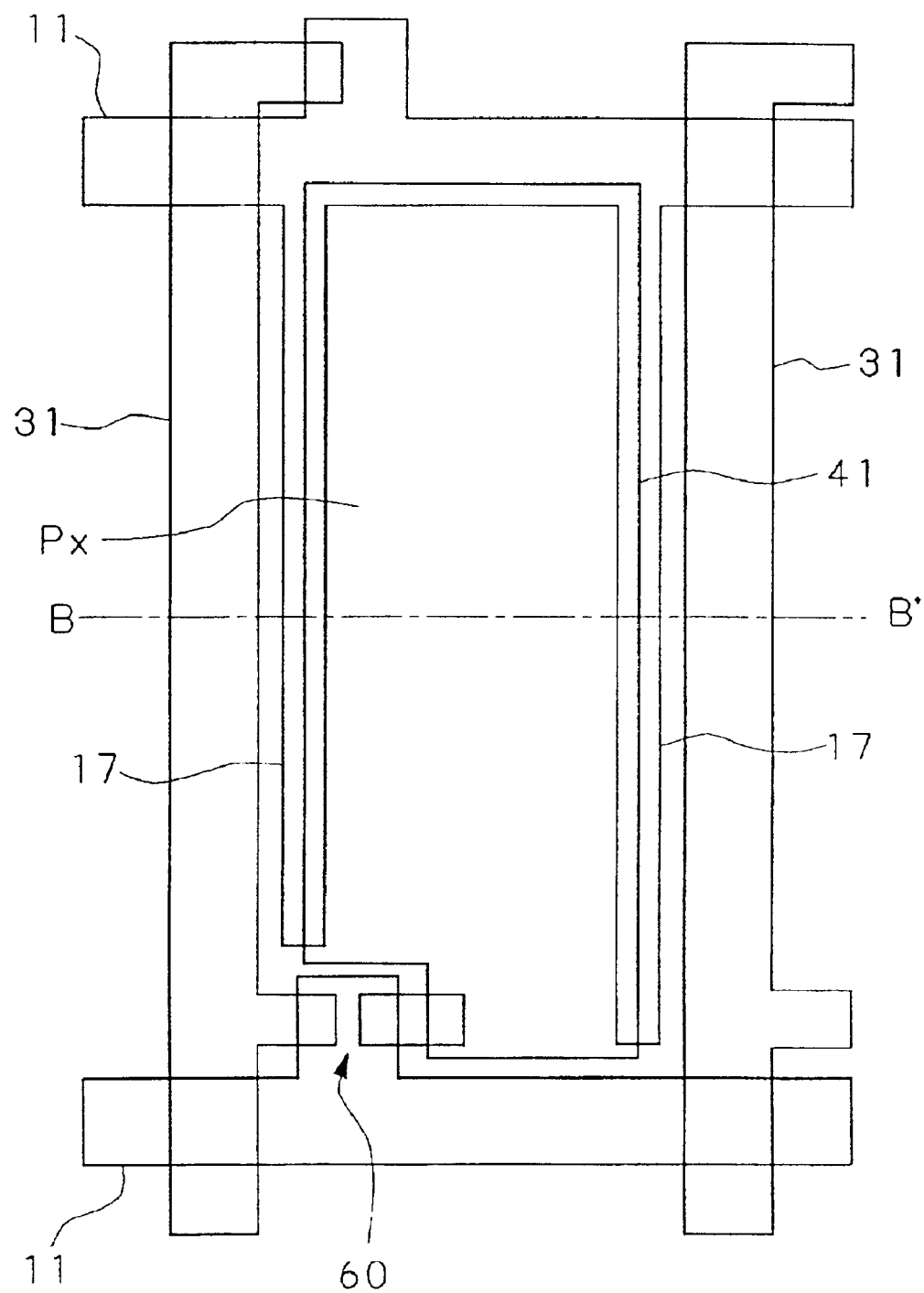
FIG. 15 is a cross-sectional view of the pixel region according to the eighth embodiment of the present invention.
Figure 16:
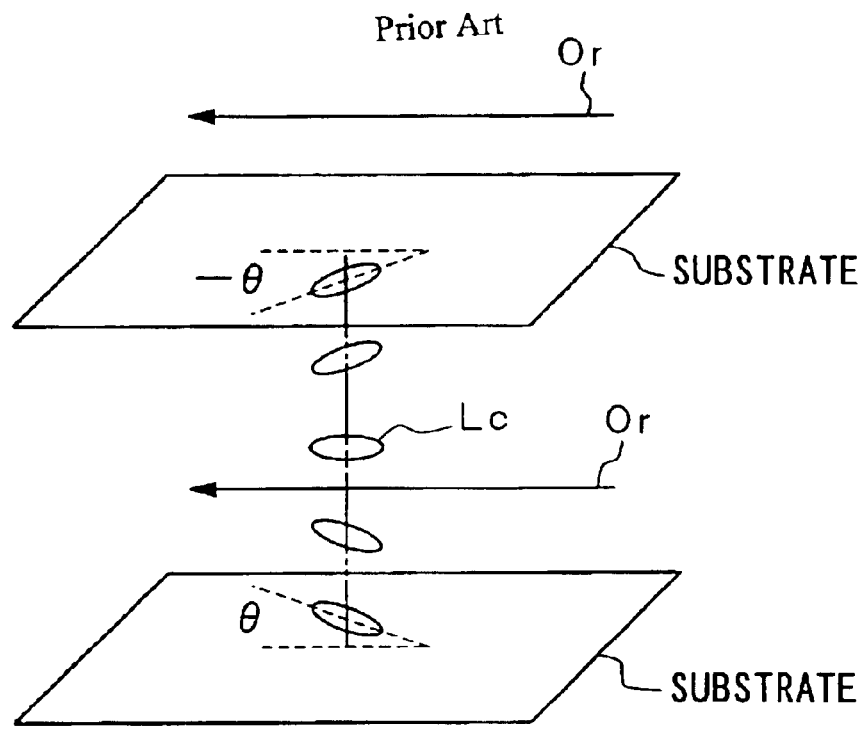
FIG. 16 is a perspective view explaining the bend type orientation.
Figure 17A:
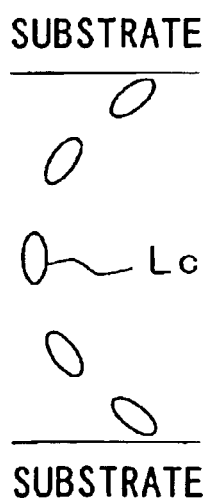
FIGS. 17A and 17B are cross-sectional views showing the arrangement of liquid crystal molecules in the pixel regions.
Figure 17B:
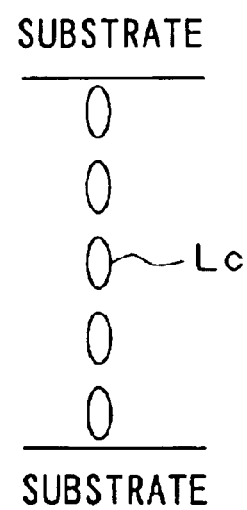

In addition, as shown in FIG. 15, the compensation electrode 17 may be extended from the scanning line in the pixel region, without providing the common wiring 13. A high voltage may be temporarily applied to the scanning line because a voltage is applied to a pixel region to which the scanning line is connected. However, at other timing, since the potential applied to the liquid crystal is held by converting the thin film transistor into an inactive state, normally the compensation electrode is maintained at a lower potential than the potentials of the signal lines or the pixel electrodes. In this case, the electric field between the signal line and the pixel electrode converges on the compensation electrode, which results in reducing the horizontal component of the electric field and prevents the liquid crystal molecules from being twisted.

[Fifth Embodiment]

Figure 11:
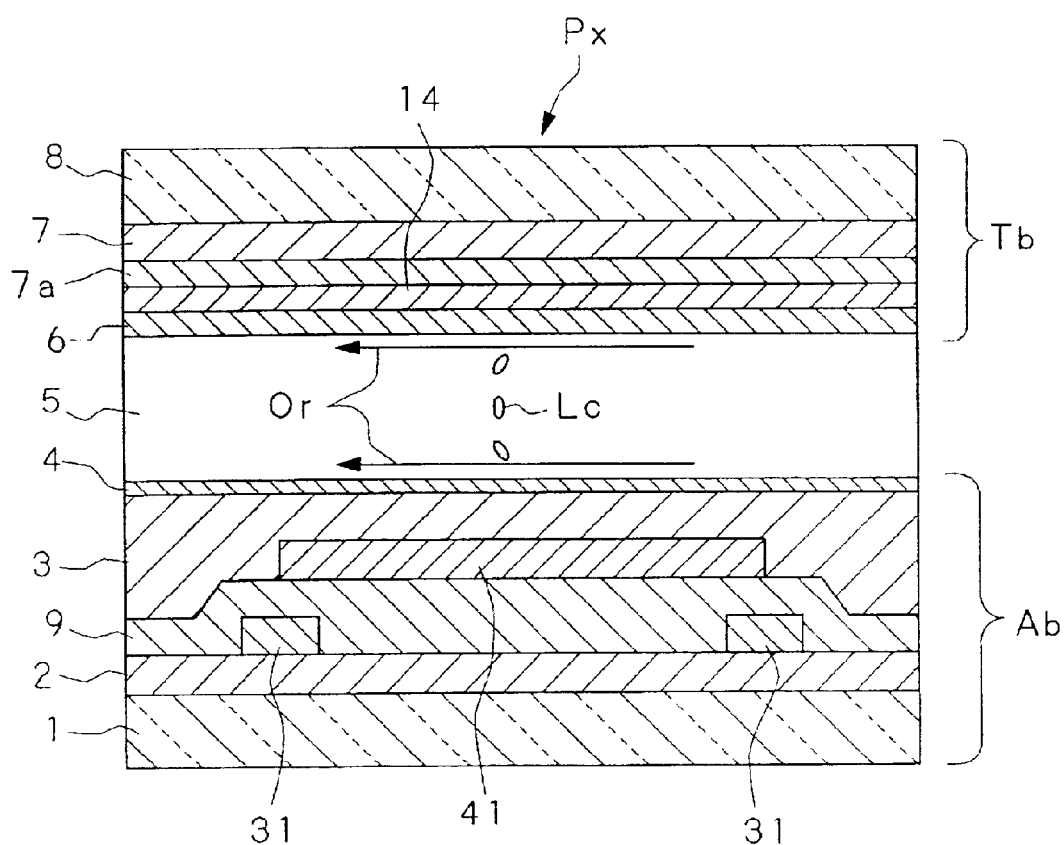
FIG. 11 is s cross-sectional view of the pixel region according to the fourth embodiment of the present invention.

FIG. 11 shows a cross-sectional view of the color liquid crystal display device according to the fifth embodiment.

The structure of the liquid crystal display device according to the fifth embodiment is the same as that of the second embodiment except in that the surface of the active matrix substrate Ab is formed so as to be flat. The manufacturing method for this liquid crystal display device is described below.

The same processes as those of the second embodiment are followed until forming the pixel electrode 41, and the n+-type a-Si film located between the drain electrode and the source electrode is removed. Subsequently, a flat protective insulating layer is formed by spin coating an acryl-base transparent resist into a thickness from 1 $\mu$m to 4 $\mu$m and by firing the coat. In this manufacturing process, an acryl base resist has been used, but it is possible to use other resists. For example, polyimide-type resists can be used if a flat surface is obtained. It is preferable to use benzocyclobutene or polysilazane containing silicone in the coatable state in order to improve the protective function of the a-Si layer. It is also possible to use silicon nitride film before coating the acryl-type resist film.

In addition to forming the flat surface by coating the resin film, it is also possible to form an insulating layer by CVD or sputtering, and to grind the surfaces of films for finishing to flat films. A very flat surface obtained by grinding the insulating film deposited by CVD or sputtering allows high precision patterning, and the thus formed insulating film provides a layer with high thermal resistance.

On the substrate having the thus formed flat surface, an orientation film made of polyimide is formed by a printing method and, after firing at 220° C., the orientation treatment is executed in the short side direction of the pixel region.

It is noted that the film thickness is not limited to the values mentioned above, and it is possible to modify the thickness depending upon the material to be used and the display size to be used and the performance of the thin film transistor.

In the fifth embodiment, although the pixel electrode 41 is formed in the upper layer of the layer including the signal line 31 through an insulating film, similar to the first embodiment, it is possible to adopt an arrangement in which the pixel electrode 41 is formed in the same layer as the layer including the signal line 31, which is inserted between the gate insulating layer 2 and the protective insulating layer 3. In both cases, since the thickness of the pixel electrode is sufficiently low when compared with the thickness of the protective layer, the surface flatness can be maintained.

The active matrix substrate of this embodiment has been obtained by the method described above.

Furthermore, similar to the second embodiment, the transparent substrate Tb is formed. The polymer beads having a diameter corresponding to the gap between the active matrix substrate Ab and the transparent substrate Tb are scattered on the entire area of the substrate, and both substrates are stacked such that both orientation films face each other, the rims are adhered, and the nematic liquid crystal is injected into the gap between both substrates.

The liquid crystal display has been obtained by the manufacturing method described above.

This color liquid crystal display device is constituted using an active matrix substrate having flat and smooth opposing surfaces, and smooth surfaces without irregularities do not allow the liquid crystal molecules to undergo the reverse tilt phenomena in which the liquid crystal molecules tend to have a the reversed direction because of surface irregularity, and the bend type orientation of the liquid crystal molecules is stabilized.

In addition using a coat of a thick transparent organic layer, a flat and smooth surface may be obtained by forming a transparent inorganic layer and polishing it.

[Sixth Embodiment]

Figure 12:
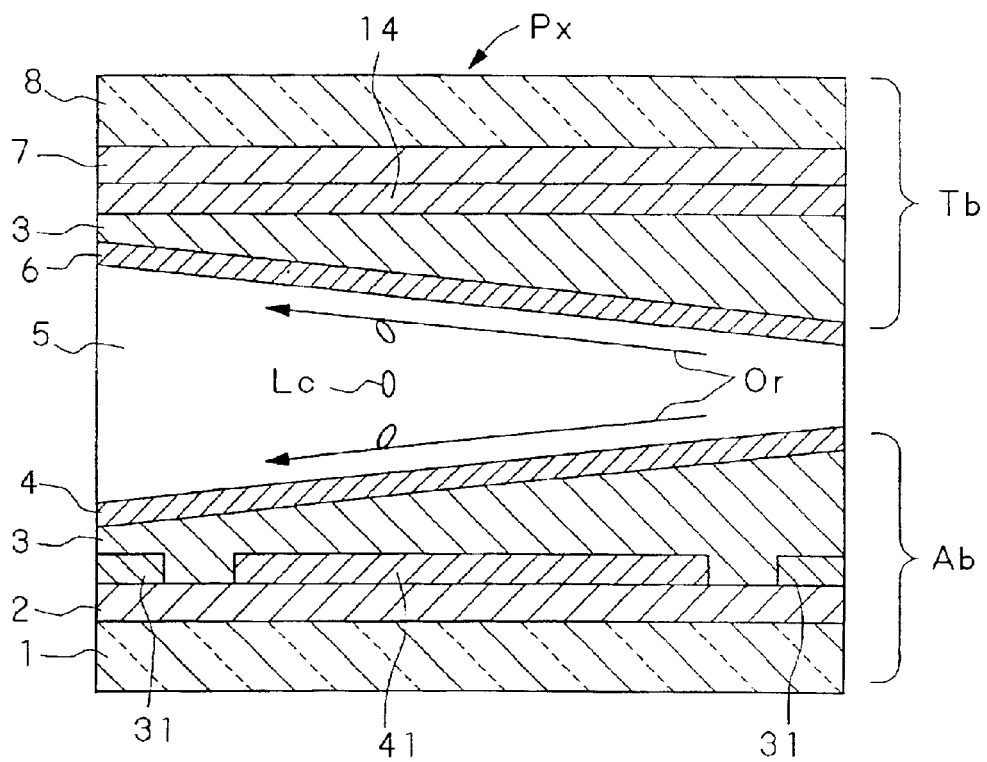
FIG. 12 is a cross-sectional view of the pixel region according to the fifth embodiment of the present invention.

FIG. 12 is a cross-sectional diagram of the color liquid crystal display device according to the sixth embodiment of the present invention.

The liquid crystal display device according to the sixth embodiment comprises a plurality of scanning lines formed in a matrix form on the substrate including thin film transistors, a plurality of signal lines arranged so as to cross the scanning lines on the substrate through a gate insulating layer, and a thin film transistor and a pixel electrode 41 formed at each cross section of the scanning line and the signal line for forming a pixel region Px. Among these elements, the thin film transistor and the pixel electrode are formed in the same forms as those of the first embodiment.

However, both of the protective layer 3 made of an organic film formed on the opposing surface of the active matrix substrate Ab and the protective layer 3 formed on the opposing surface of the transparent substrate Tb are inclined opposite to each other along the orientation direction.

A method of forming the inclined surface is described below.

Similar to the first embodiment, the forming process proceeds until forming the pixel electrode, and the n+ type a-Si layer between the drain electrode and the source electrode is removed. Subsequently, the transparent resist film is, after patterning, fired at a temperature higher than the glass transition temperature of the resist and a smoothly inclined layer is formed. Since the method to form an inclined layer is disclosed in Japanese Unexamined Patent Application, First Publication No. Hei 11-326910, a detailed explanation of the method is omitted. It is noted that formation of a silicone layer before forming the coating layer of acrylic resin or the like is effective for improving the protective function of the protective layer.

In addition, another method may be adopted to incline the opposing surfaces on both substrates by coating a radiation curable type resin on the substrate surfaces, inclining the substrates or applying a centrifugal force to incline the resin surfaces, and irradiating the resin surface for curing the inclined resin layers.

On the thus formed surface of the substrate, an orientation film made of polyimide resin is formed by the printing method, after firing at 220° C., an orientation treatment is executed along the inclined direction by the rubbing method. It is desirable that the orientation film is formed so as to tend toward the higher side from the lower side. This is because, when the rubbing is executed from the higher side to the lower side, the tilt angle tends towards the reverse direction of the inclined surface, which results in reducing the effect of the inclined surface.

It is noted that the film thicknesses are not limited to the above-described values and the film thicknesses can be modified depending on the material or the display size to be used, and the performance of thin film transistors.

The active matrix substrate Ab according to this embodiment is thus formed as described above.

On the transparent substrate Tb, an inclined protective layer 3 is formed, similar to the active matrix substrate Ab, polymer beads having a suitable diameter for the gap between the active matrix substrate Ab and the transparent substrate are scattered on the entire display surface, and these substrates are stacked such that the orientation layers face each other, and the liquid crystal is injected into the gap between these substrates.

The liquid crystal display device is thus obtained as above.

In this embodiment, the liquid crystal molecules Lc are treated so as to orient in the direction of the inclining direction. Thus, the liquid crystal molecules have a tilt angle, which is given by addition of the inclined angles for the substrates 1 and 8, and the pre-tilt angle given by the orientation film.

Thus, in the color liquid crystal display device according to this embodiment, the larger tilt angle of the liquid crystal molecules near the interface facilitates arrangement of the liquid crystal molecules into the bend-type orientation. That is, a stable bend-type orientation can be obtained by eliminating the external blocking factors.

In general, the pre-tilt angle provided by the orientation film of the conventional active matrix display device is at a level of 5 degrees. However, the method according to this embodiment is effective for providing larger tilt angles.

Although the inclination angle may be provided uniformly for the entire substrate surface, it is preferable to provide a tilt angle for the liquid crystal molecules in a range from 3 to 10 degrees, so that it is preferable to provide an inclination angle for each pixel region in order to realize the above tilt angles for each pixel region.

[Seventh Embodiment]

Figure 13:
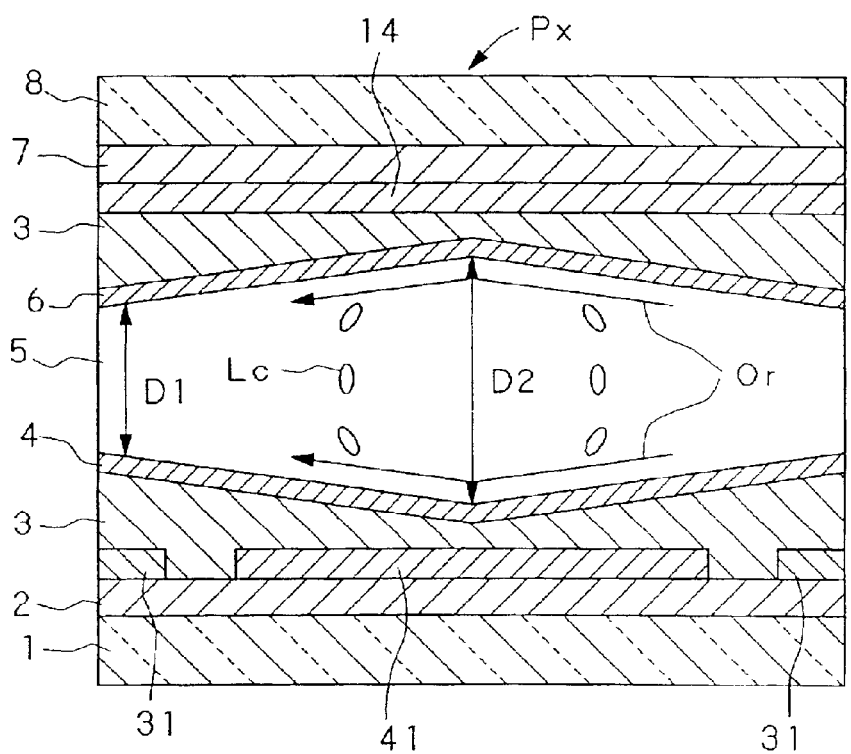
FIG. 13 is a cross-sectional view of the pixel region according to the sixth embodiment of the present invention.

As shown by a cross-sectional diagram in FIG. 13, both opposing surfaces are formed in a V-shape, such that, when viewing the cell gap 5 in a pixel region, formed between the protective insulating layer 3 made of an organic transparent layer formed on the opposing surface of the active matrix substrate Ab and the protective insulating layer 3 on the opposing surface of the transparent substrate Tb, a narrow gap width D1 at the end of the pixel region widens to a wide gap width D2 at the center of the pixel along the orientation direction Or of the pixel electrode 41. In this case, it is preferable to provide a pre-tilt angle of the orientation film of 0 degrees. If the pre-tilt angle by the orientation film is large, the large pre-tilt angle will reduce the effect of any one of the inclined surfaces.

When the surfaces of both substrates are formed so as to form the V-shape cell gap, the liquid crystal molecules at both ends of the orientation direction are oriented in the opposite directions to each other. The same opposite orientation of the liquid crystal molecules will result, if the cell gap is formed such that the cell gap width at the end portion is larger than that at the center portion. The color liquid crystal display device according to this embodiment is capable of providing a wider visual field angle because small regions having different orientation directions are formed in one cell, so that, when the screen is viewed obliquely, the visual field characteristics of the respective cells can be compensated by these small regions.

As described above, the liquid crystal display device of the present invention is a bend-type liquid crystal display device, which is formed by any one out of following three constitutions, which are, (1) the orientation tends towards within ±45 degrees of the short side axis of the pixel region, (2) the pixel electrode is disposed closer than the signal lines to the common electrode, or (3) the compensation electrode is formed between the pixel electrode and the signal line, so that the bend-type orientation of the liquid crystal molecules is not disturbed by the nearby electric field.

In the liquid crystal display device of the present invention, since the opposing surface of the active matrix substrate is made smoothly flat, or the opposing surface of the active matrix substrate is inclined in the opposite direction to that of the transparent substrate along the orientation direction, the bend-type orientation of the liquid crystal molecules is not disturbed by irregularity of the opposing surface. In addition, if the cell gap of a pixel region between the active matrix substrate and the transparent substrate is configured in a V-shape such that the narrow gap at the end portion widens to a wide gap at the center of the pixel region, the visual field angle dependence of the light shielding property at the time of the non-application mode can be reduced, and the liquid crystal display device exhibits a wide angle of visibility and good image contrast.

What is claimed is:

1. An OCB (optically compensated bend)-type liquid crystal display device, comprising:

an active matrix substrate, which comprises a plurality of rectangular pixel regions, each of which is surrounded by one of a plurality of scanning lines arranged in parallel and one of a plurality of signal lines crossing said plurality of scanning lines through an insulating layer and each of which comprises a pixel electrode and a thin film transistor, and a transparent substrate provided with a common electrode, inserting a liquid crystal therebetween, and the opposing surface of the active matrix substrate and the opposing surface of the transparent substrate are treated so as to have the same orientation directions, wherein said orientation directions are limited to within ±45 degrees for a short axis direction of the pixel electrode, such that the liquid crystal molecules are oriented approximately parallel to the short axis when the voltage is not applied between the pixel electrode and the common electrode and the liquid crystal molecules are prevented from being twisted when a horizontal electric field is applied between the pixel electrode and the signal line.

2. An OCB type liquid crystal display device according to claim 1, wherein said signal lines extend in the long side direction of said pixel region.

3. An OCB-type liquid crystal display device comprising:

an active matrix substrate, which comprises a plurality of rectangular pixel regions, each of which is surrounded by one of a plurality of scanning lines arranged in parallel and one of a plurality of signal lines crossing said plurality of scanning lines through an insulating layer and each of which comprises a pixel electrode and a thin film transistor;

a transparent substrate opposing said active matrix substrate provided with a common electrode, inserting a liquid crystal therebetween, and the opposing surface of the active matrix substrate and the opposing surface of the transparent substrate are treated so as to have the same orientation directions, wherein a compensation electrode, which is capable of generating an electric field between the scanning line and said pixel electrode, is formed in the same layer as that of the scanning line between the scanning line and said pixel, in order to absorb a force line of an electric field generated by the signal line and the scanning line.

4. An OCB-type liquid crystal display device according to claim 3, wherein said compensation electrode is formed so as to overlap with the pixel electrode of the adjacent pixel region.

5. An OCB-type liquid crystal display device according to claim 3, wherein said compensation electrode is formed so as to connect to the scanning line of the adjacent pixel region.

6. An OCB-type liquid crystal display device according to claim 4, wherein said compensation electrode is formed so as to connect to the scanning line of the adjacent pixel region.

* * * * *